(12) United States Patent
Moquin et al.

(10) Patent No.: US 7,035,420 B2
(45) Date of Patent: Apr. 25, 2006

(54) MICROPHONE GASKET WITH INTEGRATED ACOUSTIC RESISTANCE

(75) Inventors: Philippe Moquin, Kanata (CA); Stephane Dedieu, Ottawa (CA)

(73) Assignee: Mitel Knowledge Corporation, Kanata (CA)

( * ) Notice: Subject to any disclaimer, the term of this patent is extended or adjusted under 35 U.S.C. 154(b) by 0 days.

(21) Appl. No.: 11/114,795

(22) Filed: Apr. 26, 2005

(65) Prior Publication Data

US 2005/0190942 A1    Sep. 1, 2005

Related U.S. Application Data

(63) Continuation of application No. 10/078,625, filed on Feb. 19, 2002, now Pat. No. 6,978,033.

(30) Foreign Application Priority Data

Feb. 20, 2001    (GB) .................................. 0104084

(51) Int. Cl.
*H04R 11/04*    (2006.01)
(52) U.S. Cl. ...................... 381/355; 381/358
(58) Field of Classification Search ............... 381/362, 381/363, 364, 379, 386, 370, 428, 429, 430; 181/149, 185, 175
See application file for complete search history.

(56) References Cited

U.S. PATENT DOCUMENTS

| 4,028,504 | A |   | 6/1977  | Massa |
| 4,263,484 | A |   | 4/1981  | Hisatsune et al. |
| 4,349,082 | A |   | 9/1982  | Gastmeier |
| 4,796,288 | A |   | 1/1989  | Busche et al. |
| 5,491,478 | A | * | 2/1996  | de la Luz et al. .......... 381/386 |
| 5,828,012 | A | * | 10/1998 | Repolle et al. ............. 181/175 |
| 5,852,263 | A |   | 12/1998 | Dieken |
| 6,512,834 | B1 | * | 1/2003 | Banter et al. ............... 381/386 |

FOREIGN PATENT DOCUMENTS

| EP | 0 276 996 A2 | 8/1988 |
| EP | 0 973 355 A2 | 1/2000 |
| GB | 2064263 | 6/1981 |
| GB | 2 064 265 A | 10/1981 |
| GB | 2 232 322 A | 5/1990 |
| GB | 2 354 393 A | 9/1999 |
| WO | WO 98/20660 | 5/1998 |

\* cited by examiner

*Primary Examiner*—Sinh Tran
*Assistant Examiner*—Brian Ensey
(74) *Attorney, Agent, or Firm*—Fay, Sharpe, Fagan, Minnich & McKee, LLP

(57) ABSTRACT

An acoustically resistive membrane is incorporated into a gasket construction for use with a microphone. Preferably, a molded thermoplastic gasket is provided with an integrated acoustically resistive element in the form of a thin perforated membrane that is molded into the gasket at an appropriate location for optimum acoustic performance.

17 Claims, 5 Drawing Sheets

MICROPHONE GASKET WITH INTEGRATED ACOUSTIC RESISTANCE

This is a continuation of U.S. patent application Ser. No. 10/078,625, filed Feb. 19, 2002 now U.S. Pat. No. 6,978,033, which claims priority to United Kingdom Application Serial No. 0104084.9, filed Feb. 20, 2001, entitled "MICROPHONE GASKET WITH INTEGRATED ACOUSTIC RESISTANCE."

FIELD OF THE INVENTION

The present invention relates in general to microphones, and more specifically to a microphone gasket with integrated acoustic resistance.

BACKGROUND OF THE INVENTION

In many electronic appliances (e.g. telephones, answering machines, audio cassette and mini-disc recorders, etc.) integrated microphones are provided to capture acoustic signals. Generally, electret microphones are used because of their low cost and good performance. A microphone gasket or boot is usually used to isolate the microphone from the structure of the appliance and to couple the sound effectively to the microphone. The construction of such microphone gaskets ranges from very simple (e.g. a tube) to very complicated (e.g. multi-part arrangements such as found in high quality telephone handsets).

In simpler designs, a cloth facing is often used to damp the tube resonances that develop in some microphones. More complex designs utilise a piece of fabric with desired acoustical resistance mounted to a part that is inserted in the appropriate place to provide the desired acoustical damping. In some other designs, reticulated (i.e. open cell) foam is used to provide the acoustical damping.

Some lower cost microphones are fabricated without any cloth facing while other microphones incorporate a cloth facing that provides virtually no acoustical damping. When either of such microphones are used, a complex gasket must be added which incorporates a suitable acoustical damping material or else the acoustical performance will suffer.

One further problem with prior art designs is that in order to obtain repeatable acoustical responses using a fabric, foam or other acoustically resistive material the manufacturing process must be very tightly controlled. This adds to the expense of the microphone and ultimately the appliance in which the microphone is used (e.g. telephone set, answering machine, etc.).

SUMMARY OF THE INVENTION

According to the present invention, microphone gasket or boot is provided with an integrated acoustic resistance for modifying the acoustical response of the microphone. Preferably, a moulded thermoplastic gasket is provided with an integrated acoustically resistive element in the form of a thin perforated membrane that is moulded into the gasket at an appropriate location.

In a simple tube gasket embodiment where a resistive element is used to replace a cloth that would otherwise adhere to the microphone face, the membrane is placed at the end of the tube very close to the microphone face.

In an embodiment where the acoustical response of the microphone must be shaped by the structure between the microphone and the exterior of the appliance (e.g. telephone set) a series of tubes are provided, each with a membrane at the appropriate location. The specific location of the membrane may be selected using techniques well known to an acoustician that is versed in the art of micro-acoustics.

Since the membrane is not strictly rigid (i.e. it is moulded from thermoplastic) and the perforations are tapered to accommodate the moulding process, the acoustic resistance of a particular membrane can be difficult to predict theoretically. However, the acoustical behaviour of the small perforations in the thin plate membranes may be predicted according to the techniques set forth in M. R. Stinson and E. A. G. Shaw (1985), "Acoustic impedance of small, circular orifices in thin plates", J. Acoust. Soc. Am. 77, 2039–2042).

BRIEF DESCRIPTION OF THE DRAWINGS

Embodiments of the present invention will now be described with reference to the accompanying drawings in which.

DETAILED DESCRIPTION OF PREFERRED EMBODIMENTS

Figure 1A:
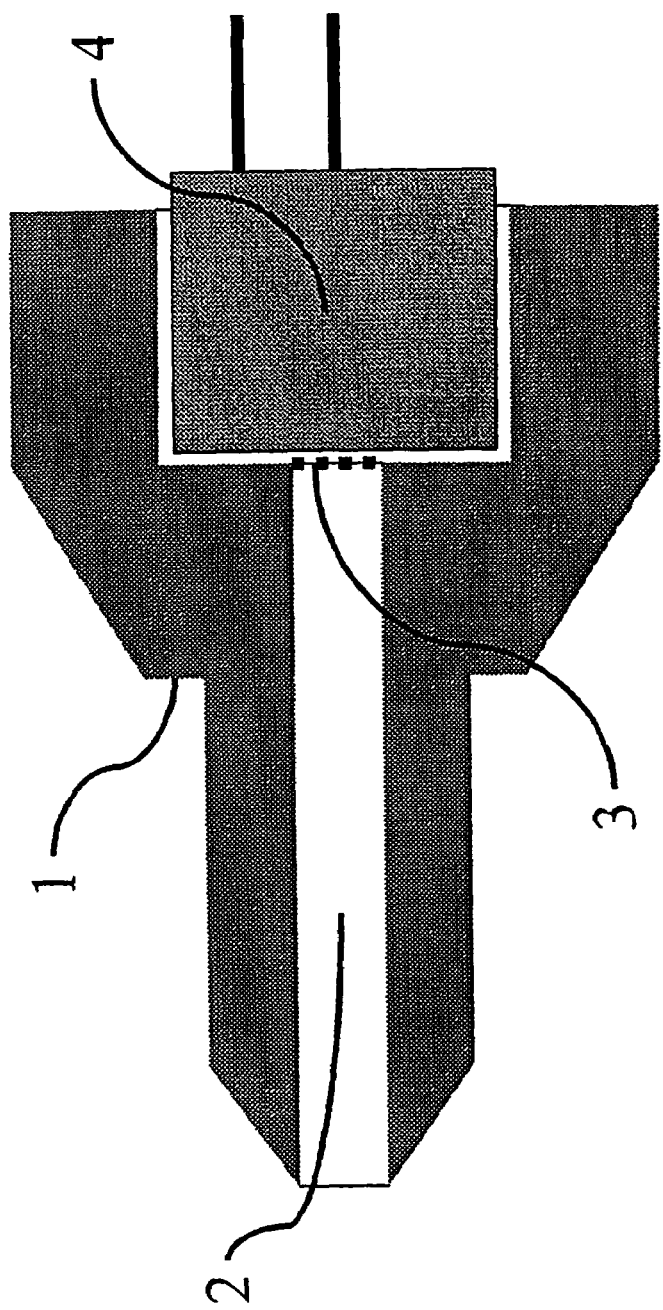
FIG. 1A is a cross sectional view of a gasket designed in accordance with the preferred embodiment.
Figure 1B:
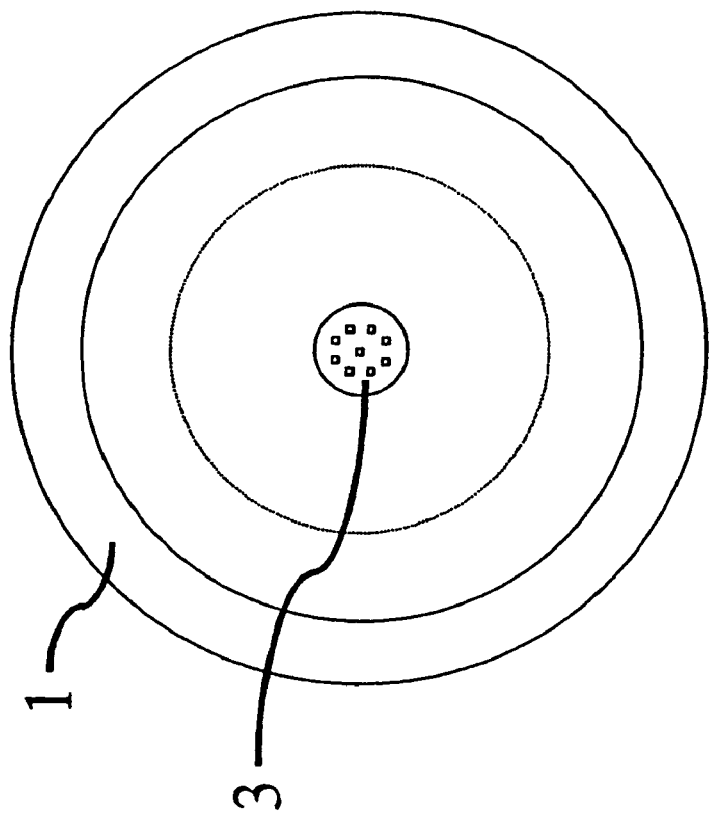
FIG. 1B is a cross sectional view along the line B—B in FIG. 1.

FIGS. 1A and 1B show a simple tube gasket designed in accordance with the preferred embodiment, for coupling sound into a hands free microphone for a telephone set. The gasket [1] has a tube [2] along which sound travels to the microphone [4]. The length of the tube [2] is chosen to provide a 400 Hz cut-off frequency and to provide significant electrostatic discharge protection. Using the rule of thumb of 1 KV of protection per millimetre, the tube is 15 mm long. It is customary in gasket designs of the form shown generally in FIG. 1 for the manufacturer to provide a simple cloth facing for the microphone. However, for the reasons discussed above such cloth facings are often unsuitable. Therefore, in accordance with the present invention, a thin perforated membrane [3] is moulded into the gasket [1] as an integral part thereof for providing the required acoustical resistance to damp the resonance inherent in the tube construction. It is known the membrane [3] will vibrate as sound/acoustical waves impinge on the membrane. Thus under this design the sound/acoustical waves propagate through the perforated membrane, both through the perforations and the non-perforated portions of the membrane. According to the preferred embodiment, nine square holes of 0.25 mm were evenly distributed throughout the 2.5 mm diameter, 0.5 mm thick membrane. Stinson and Shaw verified the following equation for predicting the acoustical impedance of thin perforated plates:

$$R \approx \frac{8}{9}\mu\left(t + \frac{16a}{3\pi}\right)\bigg/\pi a^4, \; L \approx \frac{4}{27}\rho\left(t + \frac{16a}{3\pi}\right)\bigg/\pi a^2, \text{ for } a\sqrt{\rho\omega/\mu} < 1$$

-continued $$R \approx \sqrt{2\mu\omega}\left(t+\frac{16a}{3\pi}\right)\bigg/9\pi a^3, L \approx \rho\left(t+\frac{16a}{3\pi}\right)\bigg/9\pi a^2, \text{ for } a\sqrt{\rho\omega/\mu} > 10$$

a=radius of holes t=tkickness of membrane
μ=viscosity of air p=density of air

As the holes of the preferred embodiment are in parallel, multiple holes reduce the impedance correspondingly. It will be understood however, that the above equations can only be used as a rough guide since the holes used were square and tapered and the membrane was not perfectly rigid.

Figure 2:
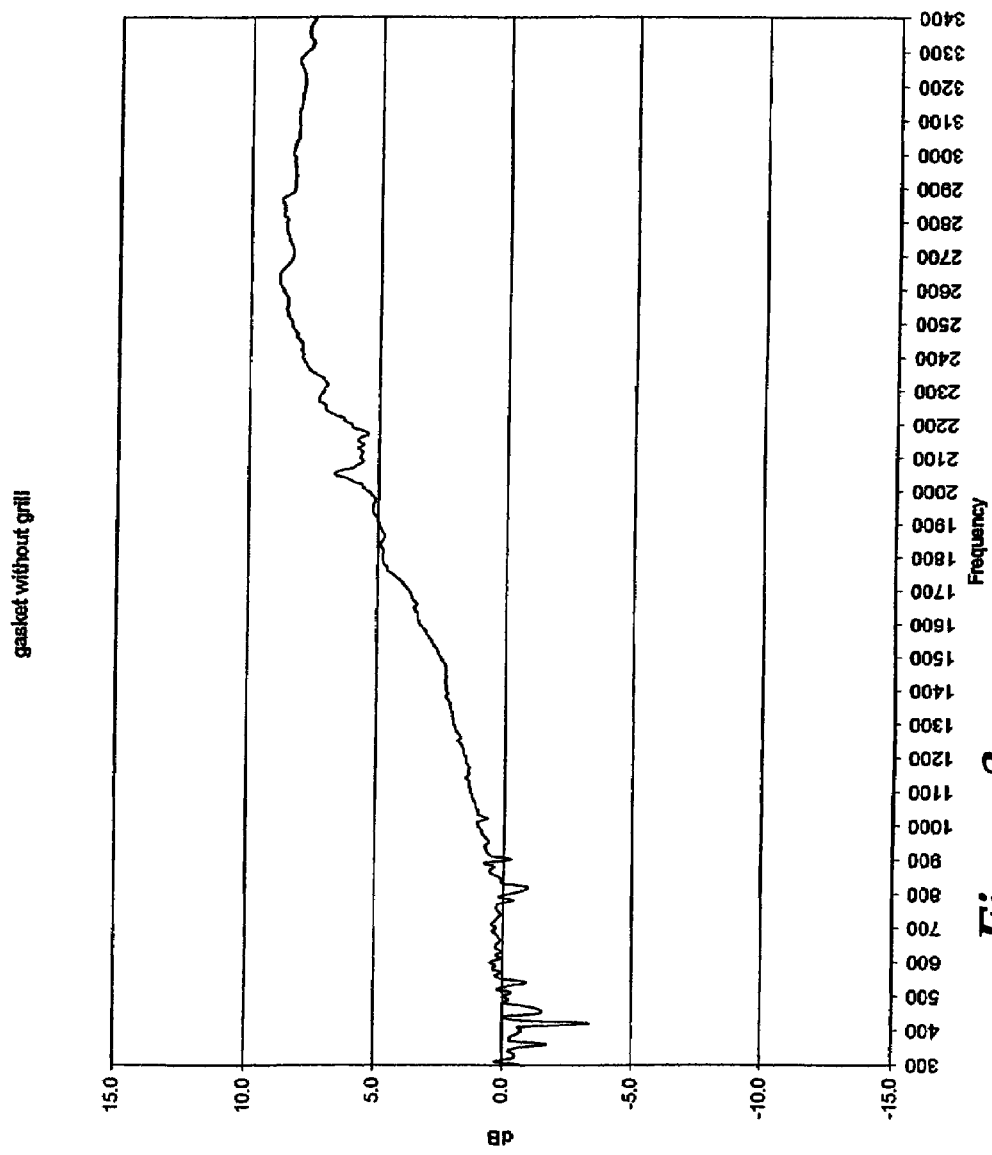
FIG. 2 is a graph showing the acoustical response of a prior art microphone gasket without perforated membrane.
Figure 3:
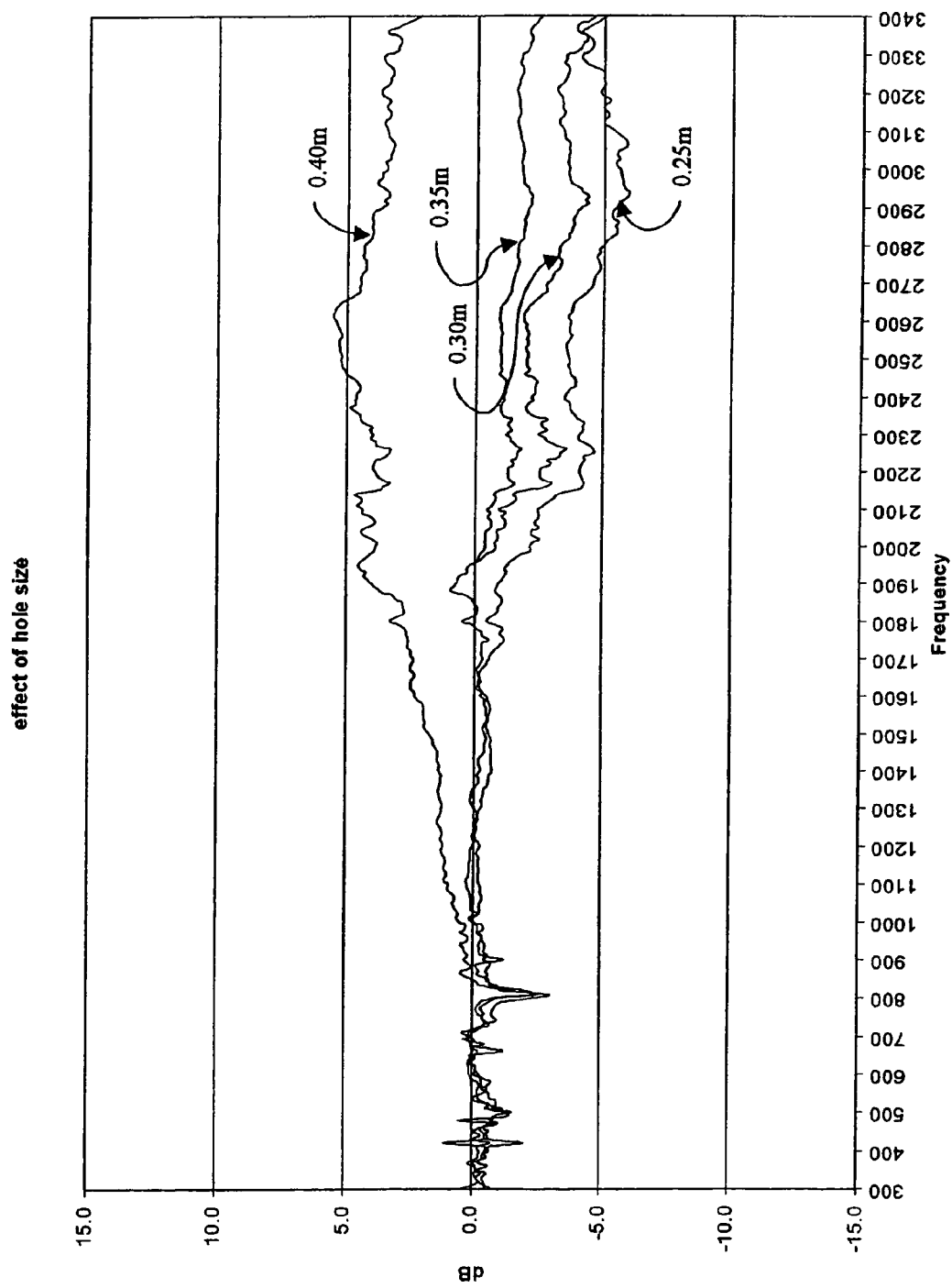
FIG. 3 is a graph showing the acoustical response of a microphone gasket with integrated acoustical resistance having different size holes, in accordance with the preferred embodiment of FIG. 1.
Figure 4:
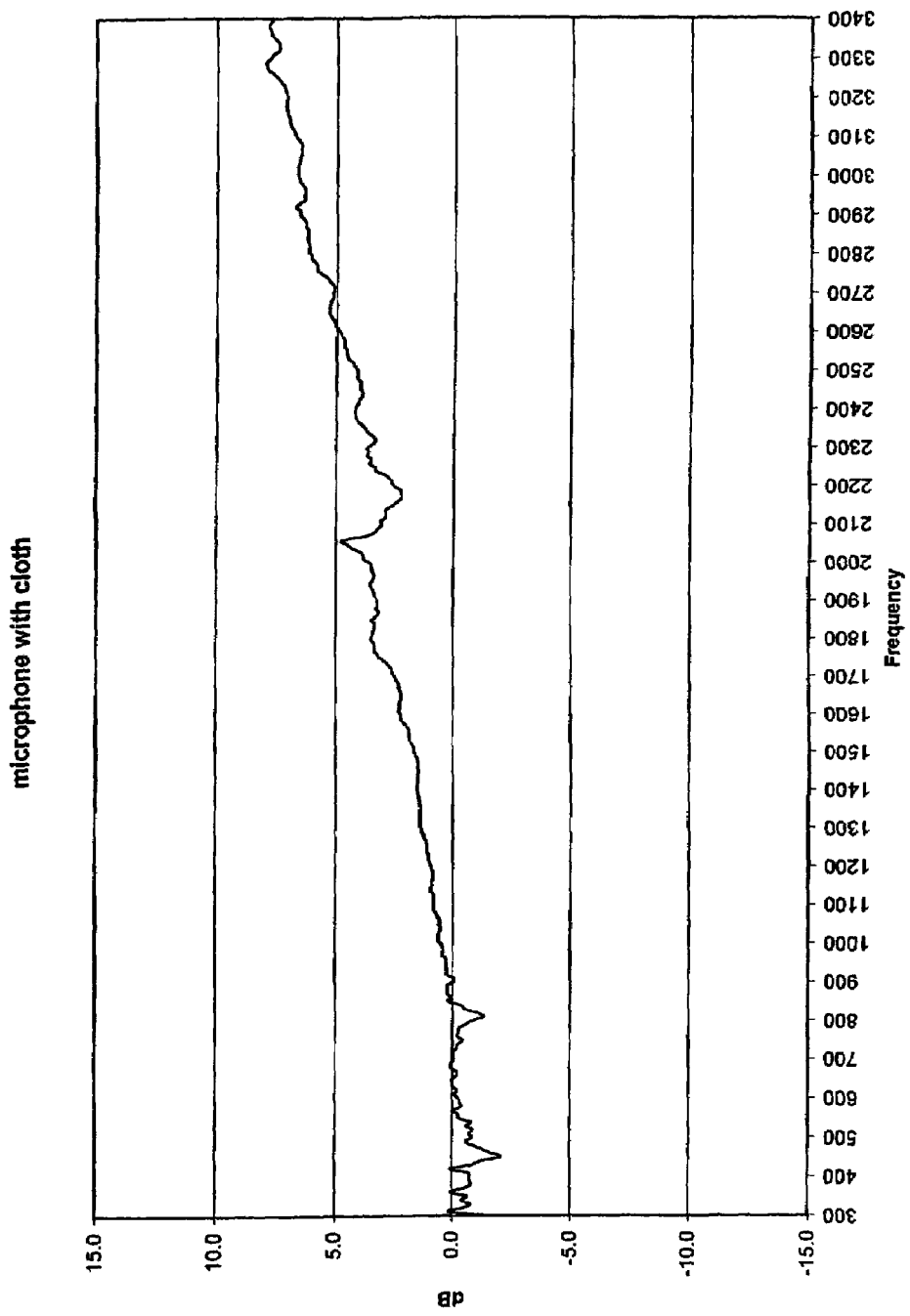
FIG. 4 is a graph showing the acoustical response of a prior art microphone gasket with only a cloth microphone covering.

FIG. 2 illustrates the response of a microphone constructed without the perforated membrane [3] of the present invention. FIG. 3 illustrates the acoustical response of a microphone constructed using the perforated membrane [3], for different sizes of perforations (0.40 mm, 0.35 mm, 0.3 mm, and 0.25 mm). The 9 dB broad resonance centred at 2500 Hz seen in FIG. 2 is greatly reduced or suppressed in FIG. 3, as well as being shifted in frequency and widened. FIG. 4 shows that a similar acoustic effect can be obtained by providing a cloth facing to the microphone, however without providing as much design flexibility.

It will be appreciated that, although an embodiment of the invention has been described and illustrated in detail, various changes and modifications may be made. For example, the acoustically resistive membrane or screen [3] may be placed at any suitable location within the gasket construction. If the gasket [1] consists of a series of tubes [2], then the respective membranes [3] may be positioned to provide the best acoustical advantage.

Other possible applications of the present invention include the design of hearing aids that use an ear mould and a tube, or headsets that have a boom microphone similar to U.S. Pat. No. 4,349,082.

All of the forgoing changes, modifications and applications may be made without departing from the sphere and scope of the invention as defined by the claims appended hereto.

What is claimed is:

1. A gasket for use with a microphone, comprising:
    at least one tube for receiving said microphone and for directing sound thereto, said tube giving rise to a characteristic acoustical response for said microphone; and
    an acoustical perforated membrane within said tube and integrally moulded therewith for modifying the acoustical response of said microphone, wherein the acoustical perforated membrane is 0.5 mm thick.

2. The gasket of claim 1, wherein the acoustical perforated membrane is 2.5 mm in diameter.

3. The gasket of claim 1, wherein the perforations are in a range of 0.25 mm to 0.40 mm.

4. The gasket of claim 1, wherein for a frequency range of 300 Hz to 3300 Hz the response range is between +6 db to −6 db.

5. The gasket of claim 1, wherein a thickness of the acoustical perforated membrane is thinner than at least a portion of the gasket defining the tube.

6. The gasket of claim 1, wherein the acoustical perforated membrane has an acoustical resistance and the acoustical perforated membrane is configured wherein the modification of the acoustical response is configured to damp the resonance inherent in the tube construction.

7. A gasket for use with a microphone, comprising:
    at least one tube for receiving said microphone and for directing sound thereto, said tube giving rise to a characteristic acoustical response for said microphone; and
    a vibrating perforated membrane within said tube and integrally moulded therewith for modifying the acoustical response of said microphone, wherein the vibrating perforated membrane is 0.5 mm thick.

8. The gasket of claim 7, wherein the vibrating perforated membrane is 2.5 mm in diameter.

9. The gasket of claim 7, wherein the perforations are in a range of 0.25 mm to 0.40 mm.

10. The gasket of claim 7, wherein for a frequency range of 300 Hz to 3300 Hz the response range is between +6 db to −6 db.

11. The gasket of claim 7, wherein a thickness of the vibrating perforated membrane is thinner than at least a portion of the gasket defining the tube.

12. The gasket of claim 7, wherein the vibrating perforated membrane has an acoustical resistance and the vibrating perforated membrane is configured wherein the modification of the acoustical response is configured to damp the resonance inherent in the tube construction.

13. A gasket for use with a microphone comprising:
    at least one tube for receiving said microphone and for directing sound thereto, said tube giving rise to a characteristic acoustical response for said microphone; and
    a perforated membrane located adjacent the microphone within said tube and integrally moulded therewith for modifying the acoustical response of said microphone, wherein the membrane is 0.5 mm thick.

14. The gasket of claim 13, wherein the membrane is 2.5 mm in diameter.

15. The gasket of claim 13, wherein the perforations are in a range of 0.25 mm to 0.40 mm.

16. The gasket of claim 13, wherein for a frequency range of 300 Hz to 3300 Hz the response range is between +6 db to −6 db.

17. The gasket of claim 13, wherein a thickness of the perforated membrane is thinner than at least a portion of the gasket defining the tube.

* * * * *